United States Patent [19]

Stromswold

[11] Patent Number: 4,604,626

[45] Date of Patent: Aug. 5, 1986

[54] ACQUISITION SYSTEM EMPLOYING CIRCULAR ARRAY

[75] Inventor: Chester E. Stromswold, Nashua, N.H.

[73] Assignee: Sanders Associates, Inc., Nashua, N.H.

[21] Appl. No.: 553,608

[22] Filed: Nov. 21, 1983

[51] Int. Cl.[4] .............................................. G01S 5/02
[52] U.S. Cl. .................................. 343/417; 343/423; 343/445
[58] Field of Search ............... 343/423, 440, 373, 368, 343/417, 445, 438, 406, 400, 403

[56] References Cited

U.S. PATENT DOCUMENTS

| | | | |
|---|---|---|---|
| 4,163,978 | 8/1979 | Shepherd et al. | 343/440 |
| 4,203,114 | 5/1980 | Gerst et al. | 343/373 X |
| 4,209,791 | 6/1980 | Gerst et al. | 343/445 X |
| 4,216,475 | 8/1980 | Johnson | 343/417 X |
| 4,254,417 | 3/1981 | Speiser | 343/368 |
| 4,263,597 | 4/1981 | Bentley et al. | 343/438 X |
| 4,316,192 | 2/1982 | Acoraci | 343/373 |
| 4,338,605 | 7/1982 | Mims | 343/373 |
| 4,382,259 | 5/1983 | Becavin et al. | 343/406 |

Primary Examiner—Theodore M. Blum
Assistant Examiner—John B. Sotomayor
Attorney, Agent, or Firm—Louis Etlinger; David J. Thibodeau, Jr.

[57] ABSTRACT

A phase-angle circuit (24) processes the outputs of an antenna array (12) to apply to a compressive receiver (20) an ensemble of signals having components whose spatial frequencies are proportional to the bearing angle of the electromagnetic plane waves that give rise to them. A signal whose phase angle is equal to twice the bearing angle is generated by interconnecting the antenna elements as two quadrupoles offset by 45°. The output of one of the quadrupoles is shifted in phase by 90° and added to the output of the other quadrupole to generate the desired signal, which is applied as an input to the compressive receiver. Other inputs to the compressive receiver are generated in similar ways. The position of the compressive-receiver output port (22) at which a maximum occurs indicates the bearing angle of the electromagnetic plane wave that gave rise to the maximum.

8 Claims, 7 Drawing Figures

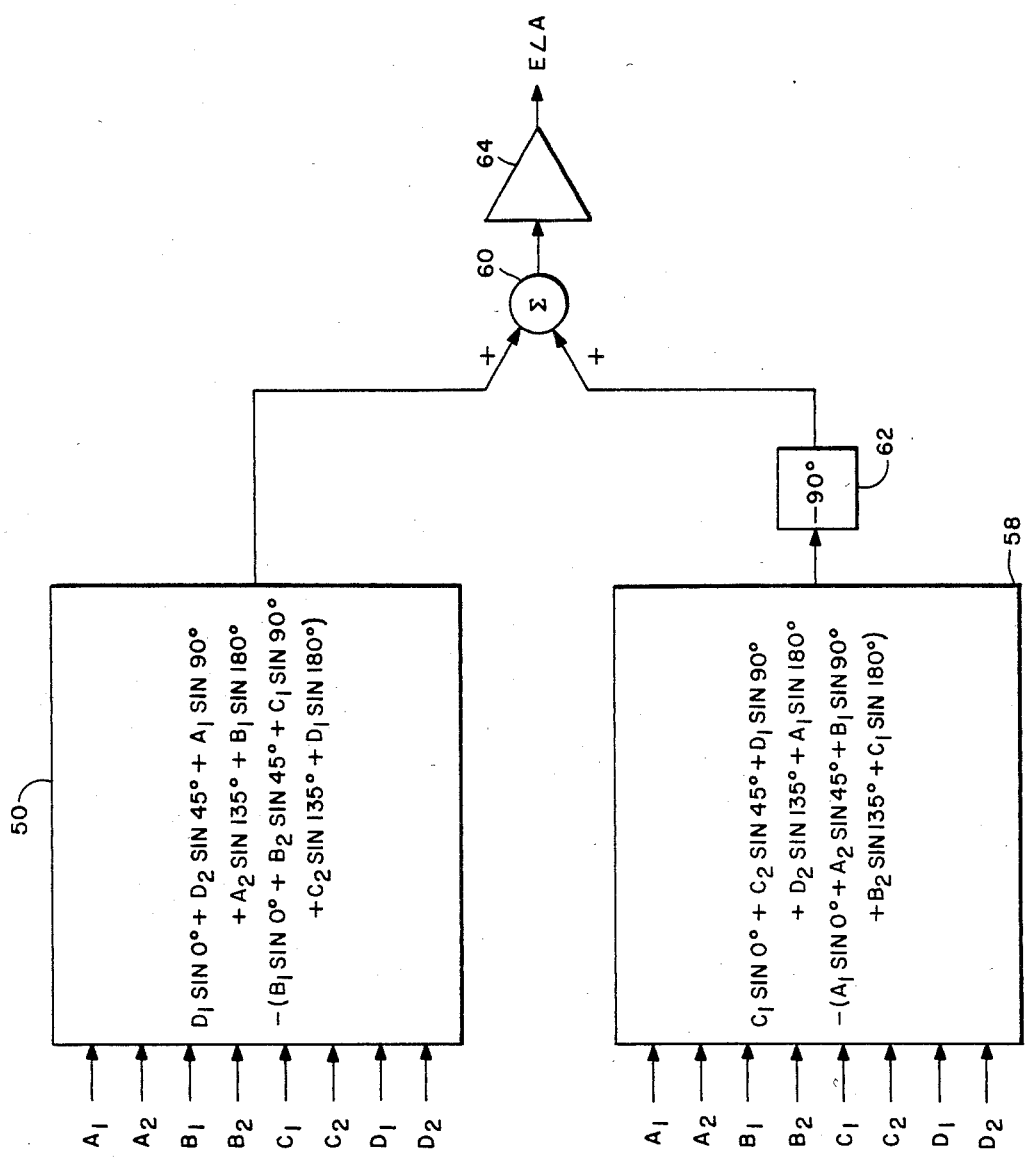

4,604,626

ACQUISITION SYSTEM EMPLOYING CIRCULAR ARRAY

BACKGROUND OF THE INVENTION

The present invention concerns systems for finding the direction of a received electromagnetic signal. It is directed specifically to such devices employing circular arrays of antenna elements.

A powerful device for use in finding the direction of an incoming electromagnetic signal is the two-dimensional compressive receiver. A two-dimensional compressive receiver employs a dispersive sonic delay line employing a number of input transducers arrayed along one edge and a number of output transducers arrayed along the opposite edge. If the signals applied to the input transducers originate in a linear array of antenna elements sensing a single plane wave, the phase relationship among the input transducers will be a linear function of element position and plane-wave bearing angle. If the bearing of the plane wave is perpendicular to the axis of the array, all of the transducer signals will be in phase. As the bearing angle increases, so does the phase difference between successive antenna elements. In the delay line, the input transducers set up interference patterns that result in constructive interference and thus a maximum at a point on the output edge that depends on the phase advance between successive input transducers of the delay line. Thus, the direction from which the signal is received is indicated by the position of the output transducer with the greatest signal.

The magnitude of the phase advance can be thought of as a spatial frequency. Just as *temporal frequency* is the rate of change of phase with respect to time, *spatial frequency* is the rate of change of phase with respect to position. The point on the output edge of the delay line where the maximum occurs is dependent on the spatial frequency at the input edge of the delay line. Thus, the delay line can be thought of as a device for performing a spatial Fourier transformation.

In addition to the spatial transformation, the two-dimensional compressive receiver also performs a temporal Fourier transformation. The compressive-receiver delay line is characterized by a delay that is a linear function of frequency. The input signals are mixed with a signal from a swept local oscillator whose frequency as a function of time corresponds to the delay-line relationship of delay to frequency in such a way that portions of an input signal at a given frequency occurring late in a local-oscillator sweep cause delay-line signals that propagate more rapidly than those caused by earlier input-signal portions at the same frequency. Thus, an input signal of a given frequency that lasts throughout the sweep of the local oscillator causes an output signal that is a very short pulse. The time at which the pulse occurs is an indication of the frequency of the signal that gave rise to it. Thus, the two-dimensional compressive receiver performs a two-dimensional Fourier transformation from time and position to temporal and spatial frequency.

In the discussion so far, it has been assumed that the antenna elements for sensing the incoming signal are disposed in a linear array. However, circular arrays are sometimes preferable, and it would be desirable to obtain the benefits of the two-dimensional compressive receiver with such arrays.

An arrangement has been proposed by Victor A. Misek for employing a four-element circular array with the two-dimensional compressive receiver, or, indeed, with any device for performing a spatial Fourier transformation, regardless of whether it simultaneously performs a temporal Fourier transformation. According to the Misek arrangement, the difference between the signals from two diametrically opposed elements is phase shifted by 90° and added to that from the other two elements, which is not phase shifted. The resultant signal, whose phase angle equals the plane-wave bearing angle, is applied to one input transducer of a two-input-transducer sonic delay line. The other input transducer receives the sum of all the element signals, which sum signal has a phase that is substantially independent of bearing angle. Four transducers on the output edge of the delay line provide a sample of the resultant interference pattern at the output edge of the delay line, and the resultant signals are detected, fed through logarithmic amplifiers, and processed by an algorithm for determining the bearing angle from the outputs.

The bearing-angle resolution of such a device is determined by the input aperture—that is, by the distance between the transducer elements that define the ends of the pattern set up on the input edge. A larger aperture results in greater bearing-angle resolution. Unfortunately, increased separation between the transducers can result in *grating lobes*—that is, spurious peaks at misleading positions on the output edge of the transducer. Accordingly, the bearing-angle resolution obtainable with this type of system is limited.

An object of the present invention is to employ the two-dimensional compressive receiver—or some other spatial-Fourier-transform device—with a circular array in a manner that, in principle, permits an arbitrarily high bearing-angle resolution.

SUMMARY OF THE INVENTION

The foregoing and related objects are achieved in a system employing 2N antenna elements, where N is an even number greater than two. The signals from the antenna elements are linearly combined to generate several signals. One signal has a phase angle, relative to the phase center of the array, that goes through 180N° as the bearing angle of the incoming plane wave goes through 360°. In other words, if the bearing angle is properly defined, the phase angle of this signal is N/2 times the bearing angle.

Other signals are generated whose phase angles are (N-2)/2 times the bearing angle, (N-4)/2 times the bearing angle, and so on, down to a signal that is independent of the bearing angle. Further signals may be generated whose phases have negative relationships to bearing angle. All of these signals are applied to input ports of a device, typically a compressive receiver, for performing a spatial Fourier transformation. Since the inputs to the device present a linear progression of phase that is proportional to the bearing angle, the device outputs indicate bearing angle. By increasing the number 2N of antenna elements, the aperture of the delay line can be made arbitrarily large without increasing transducer spacing and thus without unacceptable grating lobes in the output.

In order to generate a signal whose phase is N/2 times the bearing angle, the antenna-element signals are combined to organize the antenna elements into two N-poles angularly offset by 180°/N. That is, the alternate elements of the array form one of the N-poles, and the remaining elements form the other N-pole. Within each N-pole, signals from alternate elements of the N-pole—that are added, and the signals from the remaining elements of that N-pole are subtracted. The resultant signal has a phase that is independent of the bearing angle but has an amplitude that is a sinusoidal function of N/2 times the bearing angle. The signals from the two N-poles are in phase, but their sinusoidal relationships of amplitude to bearing angle are angularly offset by 180°/N. One of the N-pole signals is phase-shifted by 90° and added to the other N-pole signal, which is not phase shifted. The resultant composite signal has an amplitude that is substantially independent of bearing angle but has a phase that is N/2 times the bearing angle.

By appropriate weighting of the signals from the various antenna elements, other signals whose phases are multiples of the bearing angle can be obtained, and these signals are applied to the spatial-Fourier-tranform device in the manner described above.

BRIEF DESCRIPTION OF THE DRAWINGS

These and further features and advantages of the present invention are described in connection with the accompanying drawings, in which:

FIG. 5 is a diagram of the circular array of FIG. 1 illustrating its organization into dipoles;

FIG. 6 is a diagram illustrating the concept of generating a signal whose phase angle is equal to the bearing angle.

DETAILED DESCRIPTION OF THE PREFERRED EMBODIMENT

Figure 2:
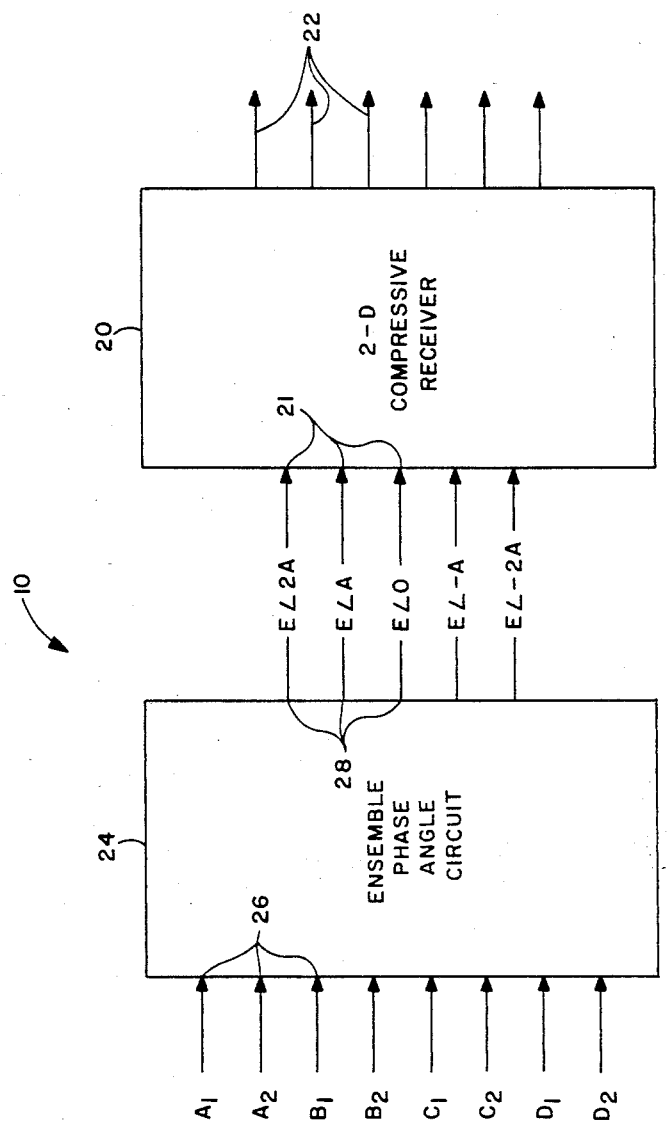
FIG. 2 is a block diagram of the system circuitry employed to determine the bearing angle of an incoming signal sensed by the elements of the array of FIG. 1.
Figure 1:
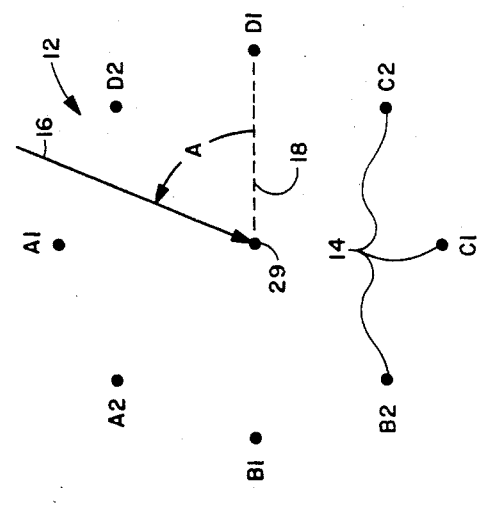
FIG. 1 is a diagram of a circular antenna array employed in the illustrated embodiment of the present invention.

FIG. 2 illustrates a system 10 for processing the signals from an antenna array 12 of FIG. 1 made up of circularly disposed antenna elements 14. The elements 14 sense electromagnetic waves propagating in a direction depicted in FIG. 1 by an arrow 16 forming an angle A with a reference direction 18.

The signals are to be processed by a two-dimensional compressive receiver 20 of FIG. 2, which performs a linear operation on the signals occurring at its input ports 21 and presents the results on its output ports 22. Each output port 22 is associated with a different input spatial frequency, and a maximum on one of the output ports 22 indicates the presence in the input-signal ensemble of a signal component having a spatial frequency at or near that with which the output port is associated.

A phase-angle circuit 24 receives at its input ports 26 signals from the antenna elements 14 and processes them to generate a signal ensemble at its output ports 28 that have a spatial frequency proportional to the bearing angle A. Specifically, circuit 24 generates five signals, one having a phase of 2A with respect to the phase center 29 (FIG. 1) of the array. The other signals have phase angles of A, 0, −A, and −2A. Thus, the spatial frequency at the input edge of the delay line of compressive receiver 20 is equal to A divided by the spacing between adjacent input transducers. By using five signals instead of the two employed in the Misek arrangement, it is possible to obtain a spacing between transducers that is low enough to suppress grating lobes adequately and yet obtain a large delay-line input aperture and thus a high bearing-angle resolution. For the sake of simplicity, an eight-element array 12 yielding five delay-line input signals is illustrated, but the principles of the present invention can be employed to provide an arbitrarily large number of delay-line input signals and thus achieve an arbitrarily high bearing-angle resolution while keeping the grating-lobe amplitudes below an acceptable level.

The antenna elements 14 in FIG. 1 are labeled A1–D1 and A2–D2. One set of elements A1–D1 is organized as a first quadrupole, while the other set of elements is organized as a second quadrupole mechanically offset by 45° from the first quadrupole. The manner in which these two quadrupoles are employed to generate the signal at a phase angle 2A with respect to the phase center is described in connection with FIGS. 3 and 4.

Figure 3:
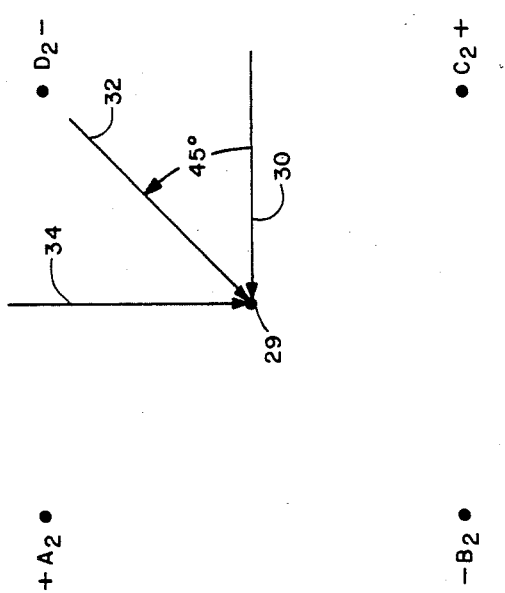
FIG. 3 is a diagram of one of the quadrupoles of FIG. 1.

FIG. 3 depicts the elements A2–D2 of the second quadrupole. As the plus and minus signs in FIG. 3 suggest, the signals from elements A2 and C2 are added, and the signals from elements B2 and D2 are subtracted. The resulting signal is one whose frequency is the same as that of the incoming signal, whose phase is the same as that at the phase center 29 of the array, and whose amplitude is proportional to the sine of twice the bearing angle A.

The foregoing attributes of the signal generated from the elements A2–D2 can be understood by inspecting FIG. 3. Consider a plane wave striking the array from the direction indicated by arrow 30 of FIG. 3. That is, consider a plane wave striking the array 12 at an angle A=0. The resulting signals on elements C2 and D2 are in phase and of the same amplitude. Therefore, since one signal is added and the other subtracted, these two signals cancel. The same can be said of the signals on elements A2 and B2, so a plane wave striking the array 12 at an angle of zero causes a second-quadrupole output of zero.

Next we consider a plane wave arriving at a bearing angle indicated by arrow 32 of FIG. 3. This plane wave arrives at an angle A=45°, so a line of equal phase contains elements A2 and C2 as well as the phase center 29. The signals from elements A2 and C2 therefore are at a phase angle of zero with respect to the phase center 29 and, since their signals are in phase with each other, they add to a maximum. On the other hand, the phase difference between the signals on elements B2 and D2 is at a maximum, so their sum is at a minimum if the array size is small compared to a wavelength. This minimum signal is subtracted from the maximum signal from elements A2 and C2 so that the total signal A2−B2+C2−D2 is at a maximum when the bearing angle A equals 45°. Between the angles A=0 and A=45°, the signal A2−B2+C2−D2 assumes values between the zero value at A=0 and the maximum value at A=45°, and its phase angle remains at zero with respect to the phase center 29.

This constant angle can be understood when it is considered that, since elements A2 and C2 are disposed diametrically opposite each other, any phase lead in one element is balanced by an equal phase lag in the other. Therefore, their quadrature components cancel, while their in-phase components add. The same is true of the signals from elements B2 and D2, so the total signal is in phase.

When the electromagnetic plane wave arrives from the direction indicated by arrow 34, the signals on lines A2 and D2 cancel, as do those on lines B2 and C2, so the resultant signal again is zero. Thus, the signal A2−B2+C2−D2 has gone from a zero value at A=0° to a maximum at A=45° and back to zero at A=90°. That is, the sinusoidal amplitude-versus-bearing-angle curve goes through 180° while the bearing angle changes by 90°. Further consideration of FIG. 3 reveals that the change in the angle of the sinusoidal amplitude curve continues at twice the rate of a change in mechanical angle through a complete circuit of bearing direction.

While the foregoing discussion does not rigorously establish the sinusoidal relationship between signal amplitude and bearing angle, a numerical evaluation of the system will reveal that, for inter-element spacings that are small compared to wavelength, the amplitude-versus-bearing-angle relationship is very nearly exactly sinusoidal if low mutual admittance among elements is assumed. As the wavelength decreases compared to inter-element spacing, the relationship becomes less exact until, at an inter-element spacing of one-half a wavelength, the relationship completely deteriorates. Thus, this system is applicable only to arrays whose inter-element spacings are small compared to a wavelength. In theory, the smaller the inter-element spacing is, the greater will be the accuracy of the sinusoidal relationship. In practice, however, too small a spacing results in the practical problems associated with supergain. Although the system can theoretically be employed down to arbitrarily low frequencies, the fullest benefits of the system cannot be expected to be obtained in most practical systems much beyond a frequency range of a couple of decades.

By comparison with the second quadrupole, it is possible to show that the amplitude of the signal A1−B1+C1−D1 from the first quadrupole varies as the cosine of twice the bearing angle A. That is, since the first quadrupole is angularly offset from the second by an angle of 45°, its amplitude relationship is offset from that of the second quadrupole by an angle of 90°. Also, like the output from the second quadrupole, the output from the first quadrupole has the frequency of the received electromagnetic wave and is in phase with the phase center 29.

This last feature bears repeating. Although the amplitude-versus-bearing-angle relationships of the two quadrupoles are 90° out of phase, their phase angles are the same; that is, the signals from both quadrupoles are in phase with the phase center 29.

Figure 4:
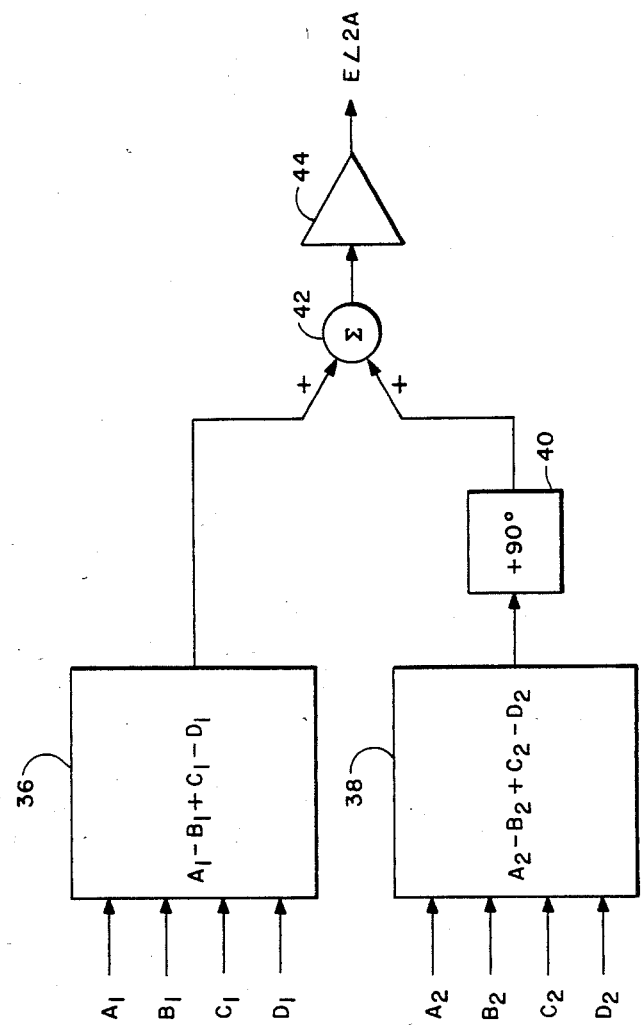
FIG. 4 is a block diagram of the circuit for generating the signal whose phase is twice the bearing angle of the incoming signal.

FIG. 4 illustrates how these two in-phase signals are processed to result in a signal that has a phase angle of twice the bearing angle. Block 36 represents the circuitry for adding and subtracting signals from alternate elements of the first quadrupole. Block 38 represents a similar circuit for the second quadrupole. It will be recalled that the amplitude of the output of block 38 varies as the sine of twice the bearing angle A. This signal is fed to a broad-band 90° phase shifter 40, whose output leads the phase center by 90°. This signal is added in a summing circuit 42 to the output of block 36, whose amplitude varies as twice the cosine of the bearing angle A. The output of the summing circuit 42 is thus a composite quadrupole signal having in-phase and quadrature components whose amplitudes are proportional to the cosine and sine, respectively, of twice the bearing angle; in other words, it is a signal whose phase angle is twice the bearing angle A. Furthermore, the amplitude of this resultant signal is independent of bearing angle.

The output of the summing circuit 42 has the phase characteristic that is desired for the top input of the compressive receiver of FIG. 2. In order to normalize the amplitude of this signal to that of the other compressive-receiver inputs, an amplifier or attenuator circuit 44 receives the output of the summing circuit 42 to perform the appropriate normalization. Furthermore, although the amplitude of the summing-circuit output is independent of bearing angle, it is dependent on the frequency of the received signal. In some cases, it may be considered desirable to compensate for this frequency dependence. If so, circuit 44 would also include frequency compensation.

The bottom compressive-receiver input signal is generated by a circuit that is the same as that of FIG. 4 with the exception that the output of the phase shifter 40 is subtracted from, rather than added to, the output of the upper block 36; two equal-magnitude signals whose phase angles are negatives of each other have equal inphase components and opposite quadrature components.

Before discussing the development of the three other inputs to the compressive receiver 20, we should observe that the circuit of FIG. 4 can be generalized from quadrupoles to other N-poles, where N is even. In the quadrupole example, N is 4, the two quadrupoles are mechanically offset by 180°/4=45°, and the signals from successive elements are added together in opposite senses. For an N-pole arrangement, two N-poles are angularly offset by 180°/N, and the signals from alternate elements are added, while signals from the remaining elements are subtracted. When N/2 is even, as it is in the quadrupole case, each N-pole signal is in phase with the phase center. After one of the N-pole signals is phase shifted and added to the other, the resultant composite N-pole signal has a phase angle of N/2 times the bearing angle.

If N/2 is odd, the signals from the N-poles are both 90° out of phase with the phase center. This follows from the fact that signals from diametrically opposed elements, whose phases are opposite, are combined in opposite senses so that their in-phase components cancel and their quadrature components add. Although the individual N-pole signals are 90° out of phase rather than in phase, the desired composite N-pole signal can still be obtained by phase-shifting one N-pole signal and adding it to the other.

The method of developing the signal whose phase angle is equal to one times the bearing angle is depicted in FIGS. 5 and 6. This method involves combining two 90° offset dipoles to obtain the desired signal. The manner of obtaining equivalent dipoles depicted in FIGS. 5 and 6 is considerably more complicated than is actually necessary in the illustrated embodiment. In actuality, because of a fortuitous positioning of the elements in the quadrupole arrays, it is only necessary to employ two elements to obtain each of the dipole signals. Such a positioniong does not obtain in general for other N-poles, however, and so the more-complicated method is illustrated in FIGS. 5 and 6 because it lends itself to generalization for other N-poles. After the discussion of FIGS. 5 and 6, a more-practical arrangement for the present embodiment will be presented in the discussion of FIG. 7.

In FIG. 5, the groups of antenna elements employed to develop the dipole signals are grouped by dashed loops 46 and 48. The first dipole element is generated from elements D1, D2, A1, A2, and B1, as loop 46 indicates, while the second dipole element is made up of elements B1, B2, C1, C2, and D1 within loop 48.

The equivalent dipole is generated according to a weighting system depicted in block 50 of FIG. 6. One dipole element is generated by adding the signals from elements disposed about one-half of the circle and weighted according to a sinusoidal weighting scheme that completes one-half cycle. That is, the elements are multiplied by amounts that progress from sin 0° to sin 180°. The depiction of elements B1 and D1 as belonging to both groups 46 and 48 is therefore arbitrary; their signals are multiplied by the sines of 180° and 0°, respectively, both of which are zero; in other words, their signals are not included.

In the system illustrated in FIGS. 5 and 6, one element of the dipole is generated from all the elements in an arc of 360°/n, n being 2 in this case. To generate some other equivalent n-pole, one combines the outputs of all of the elements in an arc of 360°/n, weighting them by a sinusoidal function that starts at sin 0° at one edge of the arc and proceeds through a half cycle to reach sin 180° at the other end of the arc; that is, the angle of the weighting function changes in most cases at a faster rate than the mechanical angle.

The signal from the first element 46 is generated by the function expressed by the top two lines of the legend of block 50, while the signal for the lower element 48 is generated by the function indicated by its two lower lines. Inspection of these functions reveals that a signal received from the direction indicated by arrow 52 of FIG. 5—that is, a plane wave whose bearing angle is zero—results in zero output. This follows from the fact that the signals on elements C2 and D2 are in phase, weighted by the same amount, and subtracted from each other, as are the signals on elements A1 and C1 and those on elements A2 and C2. For a bearing angle of zero, the output is proportional to the sine of zero.

A plane wave arriving from a direction indicated by arrow 54 results in a signal output of block 50 that is at a maximum and, since the phases of the elements in composite element 46 lead those of the composite element 48, the resultant signal is positive and leads the signal at the phase center by 90°. Specifically, the signal from element C2 lags the phase center by an angle that is the same as that by which the A2 signal leads it, and the C2 signal is subtracted from the A2 signal so that the equal in-phase components cancel and the opposite-valued quadrature components are subtracted algebraically to add in magnitude. The same is true of the signals on elements B2 and D2 and of the signals on elements A1 and C1. This canceling of in-phase components and addition of quadrature components occurs regardless of the direction of the incoming plane wave.

If the plane wave arrives at the direction indicated by arrow 56, the output will again be zero. The amplitude of the output has thus gone from a value of zero at a bearing angle of zero to a maximum at a bearing angle of 90° and back to zero for a bearing angle of 180°; that is, it has varied as the sine of one times the bearing angle. This relationship continues throughout the range of bearing angles. Again, the sinusoidal relationship is most nearly exact for wavelengths that are long in comparison with the inter-element spacing.

Block 58 depicts the function for generating an equivalent signal for a dipole that is mechanically offset by 90° from the equivalent dipole of block 50. It is apparent that this function results from rotating the loops 46 and 48 by 90° and that the amplitude of the output signal varies as the cosine of the bearing angle.

The output of block 50, as was described above, varies in amplitude as the sine of the bearing angle. Unlike the signal from block 38 of FIG. 4, which also varies in amplitude as the sine of the bearing angle, the signal from block 50 is not shifted in phase. This is because the output of block 50 already leads the phase center by 90°. In contrast, the output of block 58, which varies in amplitude as the cosine, is shifted in phase by 90°. This is because the output of block 58 leads the phase center by 90°, and it is desired for it to be in phase with the phase center.

Since the output of block 50 is applied directly to the summing circuit 60, while the output of block 58 passes through a phase shifter 62 before application to the summing circuit 60, the output of the summing circuit 60 has a quadrature component that is proportional in amplitude to the sine of the bearing angle and has an in-phase component that is proportional to the cosine of the bearing angle; in other words, the phase of the summing-circuit output with respect to the phase center 29 is equal to the bearing angle.

The output of the summing circuit 60 is applied to a circuit 64 that, like circuit 44 of FIG. 4, amplifies or attenuates the signal to normalize it so that the output of circuit 64 is equal in amplitude to that of circuit 44. Those skilled in the art will recognize that the inputs to the compressive receiver 20 should be weighted as a function of position so as to reduce sidelobes. However, this weighting function is assumed to be part of the two-dimensional compressive receiver 20, so the inputs to the two-dimensional compressive receiver 20 should be equal in amplitude. Of course, both weighting functions could be performed in a single weighting circuit.

The output of circuit 64 is the compressive-receiver input depicted in FIG. 2 as having a phase angle equal to the bearing angle. The signal whose phase angle is indicated as being the negative of the bearing angle is generated by a circuit similar to FIG. 6 except that the output of block 50 is subtracted, rather than added, to the output of the phase shifter 62.

The circuit for generating the compressive-receiver input signal whose phase angle is zero with respect to the phase center is not illustrated by a separate figure. This signal is generated by simply summing the signals from all of the antenna elements and normalizing the amplitude. Since signals from diametrically opposed elements are added, it will be apparent that the signal will be in phase with the phase center.

Figure 7:
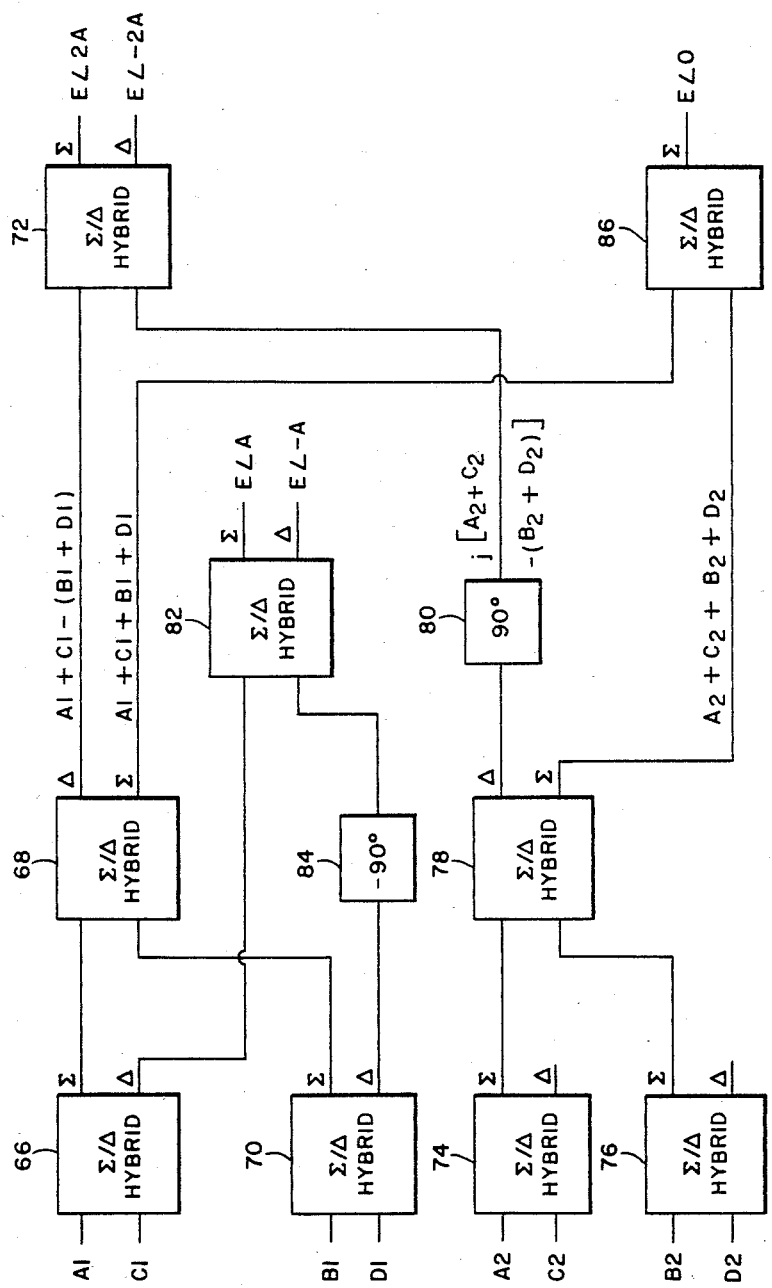
FIG. 7 is a block diagram of a practical version of the phase-signal circuitry 24 of FIG. 2.

A less complicated circuit for realizing the phase-angle circuit 24 is depicted in FIG. 7. It is intended for use with normalizing circuits, but such circuits are omitted from FIG. 7 for the sake of simplicity.

To generate the signal whose phase angle is twice the bearing angle, the circuit of FIG. 7 performs the function depicted in FIG. 4, and it performs a similar function to generate the signal whose phase angle is minus twice the bearing angle. A transformer hybrid 66 adds the signals from elements A1 and C1 and applies them as one of the inputs to another hybrid 68. The signals from elements B1 and D1 are added in a further hybrid 70 to produce the other input of hybrid 68. The difference output of hybrid 68 is applied as one of the inputs to a further hybrid 72. This input is the in-phase component of the signals whose phase angles are twice the bearing angle and minus twice the bearing angle.

To generate the quadrature component, a hybrid 74 adds the signals from elements A2 and C2, and another hybrid 76 adds the signals from elements B2 and D2. The sum output of hybrid 76 is provided as one input to another hybrid 78, which subtracts it from the output of circuit 74. The resultant signal is advanced by 90° in a broad-band phase shifter 80 to generate a quadrature component, which is provided to hybrid 72. This quadrature component is added to the in-phase component to generate the signal whose phase angle is twice the bearing angle, and it is subtracted to generate the signal whose phase angle is minus twice the bearing angle. For the sake of simplicity, the normalizing circuit is not shown.

To generate the signals whose phases are plus and minus one times the bearing angle, the circuit of FIG. 7 employs functions that are considerably simpler than the one depicted in FIG. 6. Specifically, the formula for the signal whose angle equals the bearing angle can be written as $A1 - C1 - j(B1 - D1)$. As was mentioned above, the reason why such a simple function can be employed is that elements A1, C1, B1, and D1 are happily positioned in positions appropriate for their respective dipoles. Such a coincidence cannot be counted on in the general case, and so the various n-poles will in many cases have to be generated by the method described in connection with FIG. 6.

In the simple arrangement of FIG. 7, however, a further hybrid 82 receives as its inputs a quadrature component, which is the difference output of hybrid 66, and an in-phase component, which is the difference output of hybrid 70 shifted by −90° in a phase-shift circuit 84. The sum of these signals is the compressive-receiver input whose phase angle equals one times the bearing angle, and the difference between these signals is the compressive-receiver input whose phase angle is minus one times the bearing angle.

The in-phase compressive-receiver input—that is, the signal whose phase angle is independent of bearing angle and equal to zero with respect to the phase center 29—is generated by a hybrid 86, which receives as its inputs the sum outputs of hybrids 68 and 78 and thus adds the outputs of all of the antenna elements equally.

In summary, hybrid 72 generates the compressive-receiver whose phase angles are plus and minus twice the bearing angle, hybrid 82 generates the compressive-receiver inputs whose phase angles are plus and minus one times the bearing angle, and hybrid 86 generates the compressive-receiver input whose phase angle is zero.

As was indicated above, the outputs of the circuit of FIG. 7, when applied in the appropriate order to the input transducers of the compressive receiver 20 of FIG. 2, constitute an ensemble of signals having components whose spatial frequencies are proportional to the bearing angles of the electromagnetic plane waves sensed by the antenna elements 14 of the circular array 12. The compressive receiver 20 thereby generates outputs that indicate the directions and frequencies of a multitude of signals simultaneously. Those skilled in the art will recognize that the teachings of the present invention can be applied not only with compressive receivers but also with other types of circuits for performing a spatial Fourier transformation, regardless of whether a temporal Fourier transformation is simultaneously performed. Butler matrices and digital fast-Fourier-transform modules are examples. By employing the teachings of the present invention, it is possible to obtain an arbitrarily high resolution in bearing angle while keeping grating-lobe amplitude to an arbitrarily low level.

I claim:

1. A direction-finding antenna system for determining the signal direction from which signals from a signal source are received, the system comprising:
   A. first and second concentric circular arrays, each array having N equally spaced antenna elements, where N is an even number greater than two, the first and second arrays being angularly offset by 180°/N;
   B. a processing circuit, connected to receive the signals from each of the antenna elements of the first and second arrays, for generating an ensemble of composite n-pole signals, $n = 2, \ldots N2, N$, by:
      (i) generating a first N-pole signal by adding the signals from alternate elements of the first array and subtracting the signals from the remainder of the elements of the first array;
      (ii) generating a second N-pole signal by adding signals from alternate elements of the second array and subtracting the signals from the remainder of the elements of the second array;
      (iii) shifting the second N-pole signal in phase by 90° and adding it to the first N-pole signal to generate a composite N-pole signal, in response to a single plane-wave signal with a wavelength substantially greater than twice the spacing between the elements, whose phase angle with respect to the phase center of the array is N/2 times the bearing angle of the plane-wave signal; and
      (iv) combining signals from the antenna elements to generate, in response to a single plane-wave signal with a wavelength substantially greater than twice the spacing between the elements, composite n-pole signals, $n = 2, \ldots, N-2, N$ the phase angles of the composite n-pole signals being n/2 times the bearing angle of the plane-wave signal,
   whereby the ensemble of composite n-pole signals, in response to a single plane-wave signal with a wavelength substantially greater than twice the spacing between the elements, has a spatial frequency proportional to the bearing angle of the plane wave; and
   C. a spatial-Fourier-transform device, connected to receive the ensemble of composite n-pole signals and having a plurality of output terminals, for providing at its output ports a spatial Fourier transform of the ensemble of composite N-pole signals, thereby indicating the bearing angles of incoming plane waves by the positions of maxima in the spatial Fourier transform.

2. A system as defined in claim 1 wherein the spatial-Fourier-transform device comprises a two-dimensional Fourier-transform device for performing a two-dimensional Fourier transformation from position and time to spatial frequency and temporal frequency and thereby indicating both the bearing angles and frequencies of the incoming plane waves.

3. A system as defined in claim 2 wherein the two-dimensional Fourier-transform device comprises a two-dimensional compressive receiver.

4. A method of determining the bearing angle of a plane-wave signal received by a circular array of 2N equally spaced antenna elements whose spacing is substantially less than a quarter wavelength of the plane-wave signal, where N is an even number greater than 2, the array thereby including first and second concentric circular subarrays angularly offset from each other by $180°/N$, each subarray having N equally spaced antenna elements, the method comprising the steps of:

A. generating an ensemble of composite n-pole signals, $n=2, \ldots, N$, by:
  (i) generating a first N-pole signal by adding the signals from alternate elements of the first subarray and subtracting the signals from the remainder of the elements of the first subarray;
  (ii) generating a second N-pole signal by adding signals from alternate elements of the second subarray and subtracting the signals from the remainder of the elements of the second subarray;
  (iii) shifting the second N-pole signal in phase by 90° and adding it to the first N-pole signal to generate a composite N-pole signal, in response to the plane-wave signal, whose phase angle with respect to the phase center of the array is N/2 times the bearing angle of the plane-wave signal; and
  (iv) combining signals from the antenna elements to generate, in response to the plane-wave signal, composite n-pole signals, $n=2, \ldots, N-2, N$ the phase angles of the composite n-pole signals being n/2 times the bearing angle of the plane-wave signal, whereby the ensemble of composite n-pole signals, in response to a single plane-wave signal with a wavelength substantially greater than twice the spacing between the elements, has a spatial frequency proportional to the bearing angle of the plane wave; and B. performing a spatial Fourier transformation on the ensemble of composite N-pole signals, thereby indicating the bearing angles of incoming plane waves by the positions of maxima in the resulting spatial Fourier transform.

5. A method as defined in claim 4 wherein the step of performing a spatial Fourier transformation comprises performing a two-dimensional Fourier transformation from position and time to spatial and temporal frequency.

6. A processing circuit for determining the bearing angle of a signal source, connected to receive the signals from each of the elements of a first and second receiving antenna array, for generating an ensemble of composite n-pole signals, $n=2 \ldots, N$, comprising:

A. means for generating a first N-pole signal by adding the signals from alternate elements of the first array and subtracting the signals from the remainder of the elements of the first array;

b. means for generating a second N-pole signal by adding signals from alternate elements of the second array and subtracting the signals from the remainder of the elements of the second array;

C. means for shifting the second N-pole signal in phase by 90° and adding it to the first N-pole signal to generate a composite N-pole signal, in response to a single plane-wave signal with a wavelength substantially greater than twice the spacing between the elements, whose phase angle with respect to the phase center of the array is N/2 times the bearing angle of the plane-wave signal; and D. means for combining signals from the antenna elements to generate, in response to a single plane-wave signal with a wavelength substantially greater than twice the spacing between the elements, composite n-pole signals, $n=2, \ldots, N-2, N$, the phase angles of the composite n-pole signals being n/2 times the bearing angle of the plane-wave signal, whereby the ensemble of composite n-pole signals, in response to a single plane-wave signal with a wavelength substantially greater than twich the spacing between the elements, has a spatial frequency proportional to the bearing angle of the plane wave.

7. A direction-finding antenna system for determining the direction from which signals from a signal source are received, the system comprising:

A. first and second concentric circular arrays, each array having N equally spaced antenna elements, where N is an even number greater than two, the first and second arrays being angularly offset by $180°/N$;

B. means for generating an ensemble of composite n-pole signals, $n=2, \ldots, N-2, N$, connected to receive the signals from each of the antenna elements of the first and second arrays, the pahse angles of the composite n-pole signals being n/2 times the bearing angle of the plane-wave signal, whereby the ensemble of composite n-pole signals, in response to a single plane-wave signal with a wavelength substantially greater than twice the spacing between the elements, has a spatial frequency proportional to the bearing angle of the plane wave; and C. a spatial-Fourier-transform device, connected to receive the ensemble of composite n-pole signals and having a plurality of output terminals, for providing at its output ports a spatial Fourier transform of the ensemble of composite N-pole signals, thereby indicating the bearing angles of incoming plane waves by the positions of maxima in the spatial Fourier transform.

8. A system as defined in claim 1 wherein N is an integer greater than 4.

* * * * *

UNITED STATES PATENT OFFICE
CERTIFICATE OF CORRECTION

PATENT NO. : 4,604,626
DATED : August 5, 1986
INVENTOR(S) : Chester E. Stromswold It is certified that error appears in the above-identified patent and that said Letters Patent are hereby corrected as shown below:

Column 3, line 2, delete "——that" and substitute therefor

-- --that is, signals from every fourth element of the total array-- --.

Column 8, line 16, change "90°" to -- -90°--.

Column 10, line 20, change "N2" to --N-2--.

Signed and Sealed this

Fourth Day of November, 1986

[SEAL]

Attest:

DONALD J. QUIGG

Attesting Officer     Commissioner of Patents and Trademarks